June 28, 1927.
L. F. LAMPLOUGH
1,633,590
METHOD OF AND APPARATUS FOR VULCANIZING RUBBER
Filed Oct. 25, 1923  3 Sheets-Sheet 2
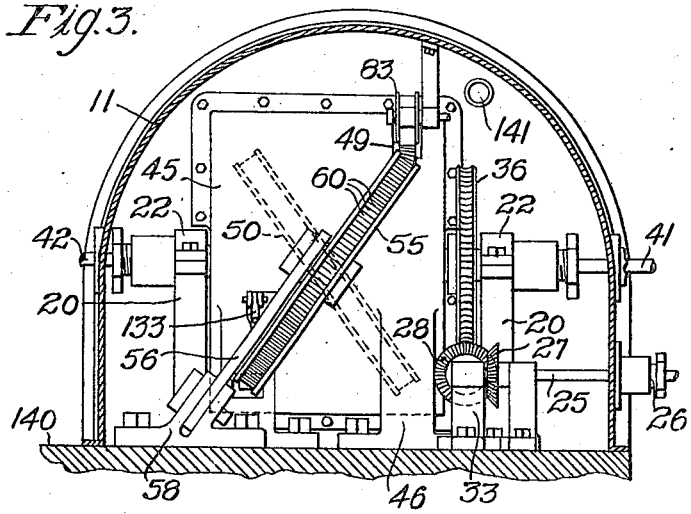
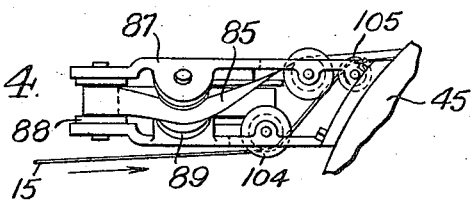
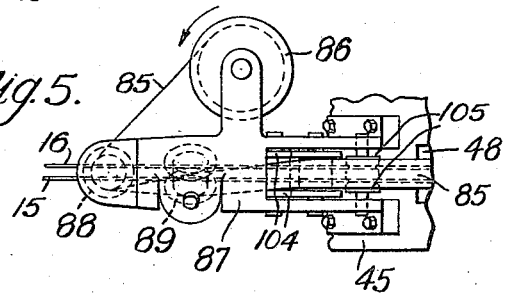
Inventor
L.F.Lamplough
by H.C.Pattison
Atty.

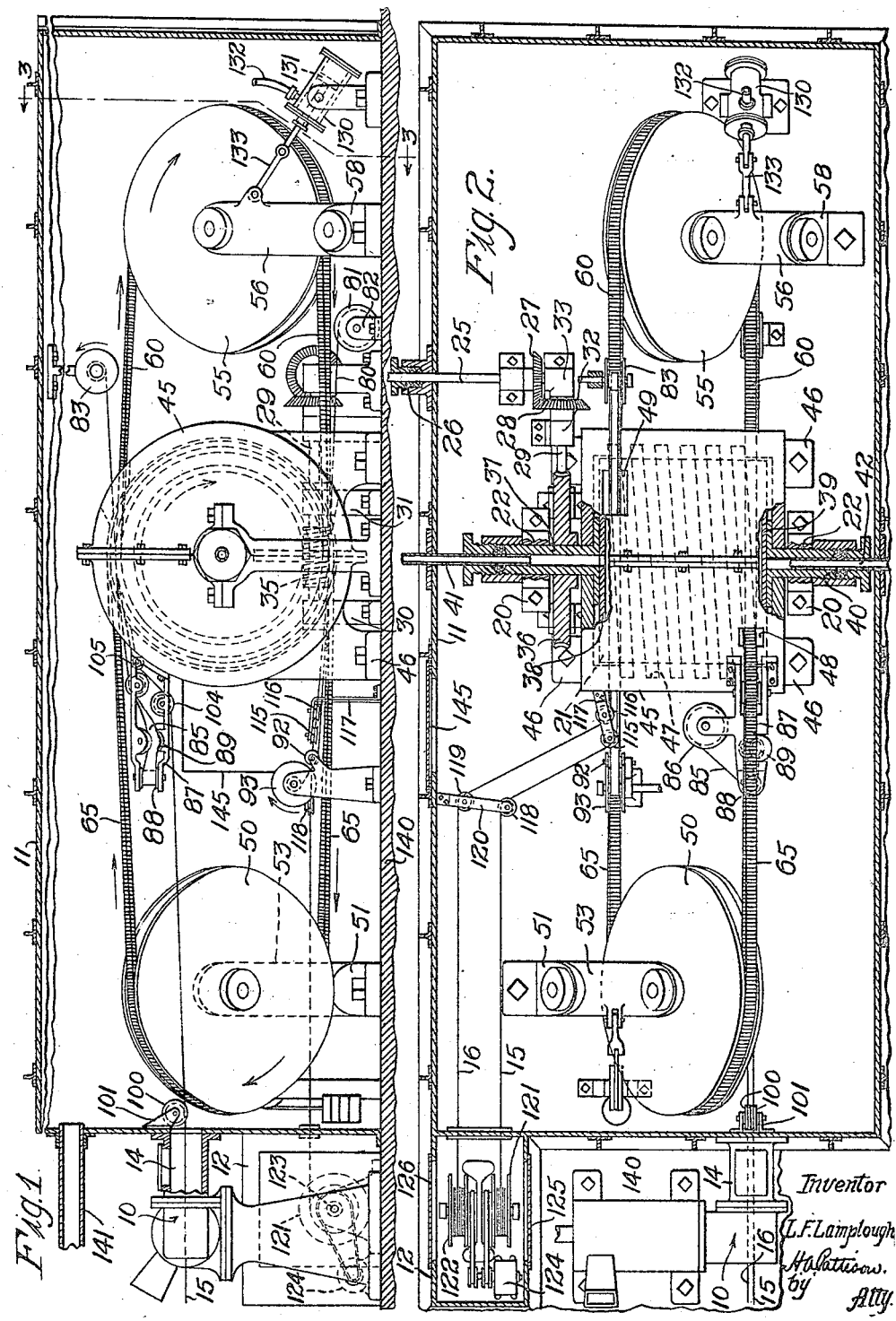

June 28, 1927.

L. F. LAMPLOUGH 1,633,590

METHOD OF AND APPARATUS FOR VULCANIZING RUBBER

Filed Oct. 25, 1923  3 Sheets-Sheet 3

Inventor
L.F.Lamplough
by H.A.Pattison
Atty.

Patented June 28, 1927.

1,633,590

UNITED STATES PATENT OFFICE.

LESLIE FAWCETT LAMPLOUGH, OF CHICAGO, ILLINOIS, ASSIGNOR TO WESTERN ELECTRIC COMPANY, INCORPORATED, OF NEW YORK, N. Y., A CORPORATION OF NEW YORK.

METHOD OF AND APPARATUS FOR VULCANIZING RUBBER.

Application filed October 25, 1923. Serial No. 670,691.

This invention relates to methods of and apparatus for vulcanizing material, and more particularly to a method of and apparatus for vulcanizing a continuously moving length of material.

In the manufacture of wire or cable covered with vulcanized material, such as a rubber compound, it is desirable to make the process continuous from the application of the vulcanizable material to the completion of the vulcanization. This continuity of process obviates the necessity of handling the material between succeeding steps in the manufacture, thus cheapening and expediting the manufacture, as well as eliminates the possibility of irregularities in and injury to the material which might be introduced due to intermediate handling thereof, such as winding upon a reel. Such a process is particularly advantageous in the manufacture of rubber covered wires or cables if they are used as electrical conductors and wherein the vulcanized material constitutes an insulating sheath for the core. In instances of this nature deformation of the material which might be occasioned by handling the sheathed core before the sheathing is properly vulcanized, may in some cases decrease the thickness of such sheath at some points along the core, thus materially lessening the insulation resistance of the sheath at such points.

It is an object of the invention to maintain a length of continuously moving vulcanizable material under the same unit pressure throughout during its vulcanization.

Another object is to subject vulcanizable material to mechanical and air or gaseous pressure during the vulcanization of such material.

An additional object is to subject vulcanizable material to mechanical compression at a plurality of separated points, and to air or gaseous pressure therebetween during vulcanization.

A further object is to support a length of vulcanizable material by continuously moving a length of supporting material upon a train of interconnected carriages provided with anti-friction means along a track or way while being subjected to vulcanizing conditions.

A still further object is to improve and simplify apparatus for vulcanizing a continuously moving length of material.

An apparatus by which the method may be practiced may include a rotating heated drum, over which a pair of cooperating endless trains of interconnected separable molds provided with anti-friction rollers, travel in a spiral path being guided by tracks or ways formed in the interior surface of a stationary enclosure surrounding the drum. The upper and lower mold portions are each provided with a plurality of grooves and are brought into engagement with the grooves in alignment as they approach and are separated as they leave the drum. Continuous lengths of fabric, paper, tin foil or some similar material are fed to and cover the engaging surfaces of the mold portions as they approach each other, and therebetween a plurality of wires or cables covered with vulcanizable rubber compound are fed directly from an extruding machine. The drum is heated to a vulcanizing temperature and the length of the path thereover which is followed by the trains as well as the speed of rotation of the drums are such as to insure the proper degree of vulcanization of the sheaths during this travel. The continuous lengths of fabric or other material covering the sheathed cores serve to suitably support them throughout the short intervals between adjacent carriages in each train, as well as to prevent injury and deformation of the sheathed material at these points. The entire apparatus between the extruding machine and the takeup reel, or other means for storing the vulcanized wire, is enclosed in a chamber and subjected to air or gas under a sufficient pressure to effectively overcome the internal stresses produced in the sheath material during the process of vulcanization, and thus cooperate with the continuous strips of fabric and the mold members in maintaining the sheath with uniform outer diameter and even surface.

Other features of the invention will clearly appear from the following description and the accompanying drawings illustrating an embodiment of the apparatus which may be used in practicing the invention.

In the drawings,

Fig. 1 is a side elevation, partially in section, of the mechanism employed, directly associated with an extruding machine and a take-up apparatus;

Fig. 2 is a plan view, also partially in section, of the apparatus shown in Fig. 1;

Fig. 3 is a sectional end view taken along the lines 3—3 of Fig. 1;

Fig. 4 is an enlarged fragmentary side elevation of the apparatus, showing particularly the apparatus for supplying lining or supporting material to the traveling molds;

Fig. 5 shows a plan view of the apparatus shown in Fig. 4;

Figure 6:
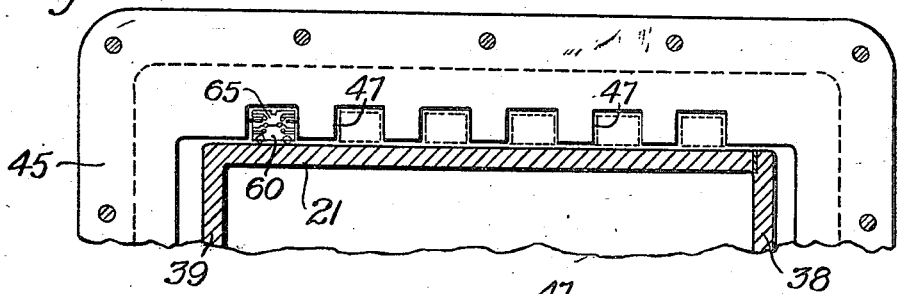
Fig. 6 is an enlarged view, partially in section of the rotating drum and its enclosure.
Figure 7:
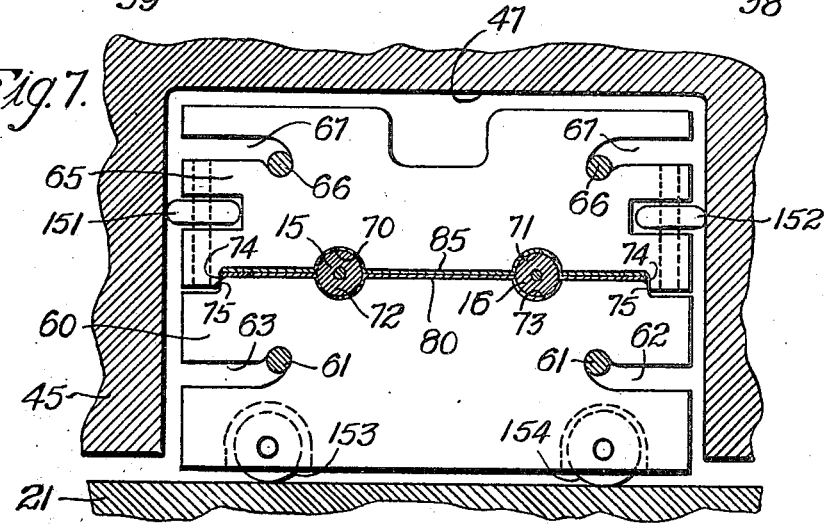
Fig. 7 is an enlarged view, partially in section, of the conveyor shown in Fig. 6.
Figure 8:
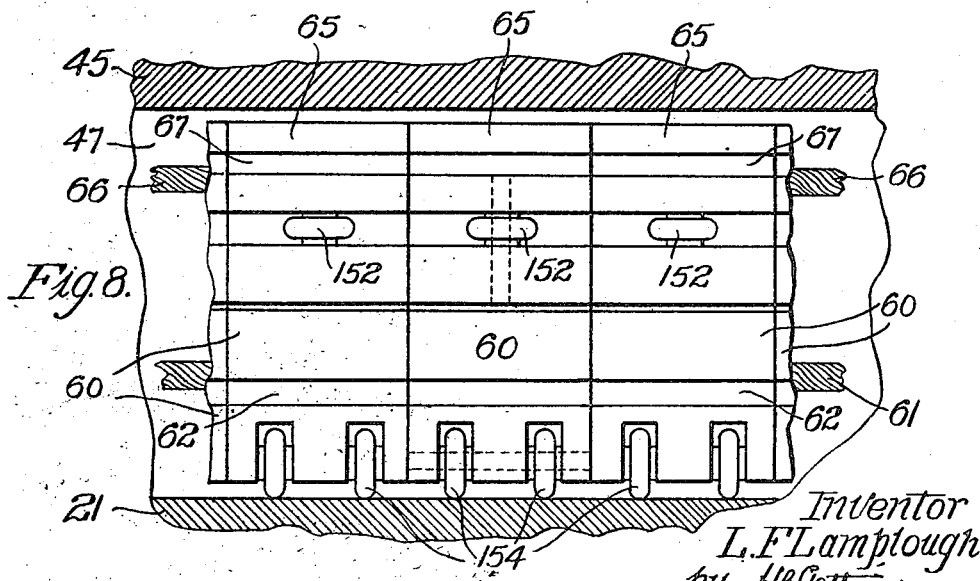
Fig. 8 is a fragmentary side elevation of the conveyor, showing particularly the side elevation of one of the carriages employed in the conveyor.

Referring to the drawings in detail, in which like reference numerals designate similar parts throughout the various figures, 10 represents an extruding machine of any ordinary type, such as is used to extrude rubber compound around a plurality of wires or cables, 11 is an air-tight enclosure surrounding the vulcanizing apparatus, and 12 is an enclosure for the take-up apparatus for receiving the vulcanized strand material. Associated with the extruding machine and directly connecting the machine with the enclosure 11 is an air-tight chamber 14 containing powdered soapstone through which a plurality of wires or cables 15 and 16 pass on their way to the chamber 11. Within the enclosure 11 and supported from a base 140 by suitable brackets 20 is a hollow drum 21, rotatable within bearings 22. A main line shaft 25, which may be driven from any suitable source of power (not shown) extends through a stuffing box 26 into the enclosure 11 and carries a beveled gear 27 which meshes with a beveled gear 28 carried upon the end of a shaft 29. The latter mentioned shaft is supported by suitable bearings 30, 31 and 32, while the former mentioned shaft is supported within a bearing 33. Shaft 29 also carries a worm 35 meshing with a worm wheel 36, which is secured to a sleeve 37 and the latter is in any well known manner suitably attached to a head 38 of the drum 21. A similar sleeve 40 is also attached to the other head 39 of the drum so that upon the rotation of the shaft 25, the shaft 29 rotates and in turn causes the sleeve 37 to rotate and cause the rotation of the drum 21 in the bearings 22. Conduits 41 and 42 extending through the walls of the enclosure 11 also extend into the hollow sleeves 37 and 40 respectively, being provided with suitably packed joints as they enter the sleeves. The conduit 41 may be connected with any suitable source of steam for heating the interior of the drum 21, and the conduit 42 is extended downwardly inside the drum to serve as a means for removing condensation from the drum.

A casing 45 supported by a plurality of brackets 46 surrounds the drum. A rectangular groove 47 formed on the interior surface of the casing 45 forms a spiral track, extending substantially from one end to the other of the drum 21. Access is gained to the interior of the casing 45 by apertures 48 and 49 located at either end and near the top of the casing. Similarly, although not shown, corresponding apertures are provided near the bottom of the casing below the drum. The casing 45 may be composed of two substantially similar portions joined at the top and bottom by means of cooperating flanges bolted together as shown.

Near the left hand end of the enclosure 11 a grooved idler pulley 50 is rotatably secured to one end of an extension arm 53, the other end of which is pivotally secured to an angular bracket 51. Near the right hand end of the enclosure 11 is a similar pulley 55 rotatably mounted upon one end of an extension arm 56, the other end of the arm being pivotally attached to an angular bracket 58 as shown more clearly in Figs. 2 and 3. The brackets 51 and 58 are mounted at such angles that the top of the idler pulley 50 is substantially in line with one end of the drum, while the bottom of such pulley is substantially in line with the other end of the drum, and the top and bottom of the pulley 55 are also substantially in line with the opposite ends of the drum. A plurality of carriages 60 are placed closely adjacent to each other by being loosely mounted upon a pair of endless cables or strands 61 by means of slots 62 and 63. These carriages and the associated strands 61 form an endless train. which extends around the idler pulley 55, enters the casing 45 near the bottom at one end thereof, passes around the left hand side of the drum and enters one end of the track 47, passes through such track in contact with the drum and emerges through the aperture 49 of the casing.

A plurality of carriages 65 are somewhat similarly carried by a pair of endless cables or strands 66 engaging slots 67, similar in character to slots 63, to also form an endless train. This latter train passes around the idler pulley 50, enters the aperture 48 in the casing 45 where the carriages 65 register with the carriages 60 of the other train, and after traversing the track 47 to the other end of the drum where it disengages from the first mentioned train, it leaves the casing 45 through an aperture in the lower portion thereof and is then carried back to the pulley 50.

The lower surfaces of the carriages 65 are provided with a plurality of individual grooves 70 and 71, adapted for exact registration with similar grooves 72 and 73 formed in the upper surfaces of the carriages 60. In order to insure this exact registration of these grooves, shoulders 74 on the upper carriages 65 cooperate with shoulders 75 formed in the lower carriages 60.

A strip of fabric, paper, tin foil, or some other suitable material 80 is fed from a supply spool 81 rotatably mounted between a pair of floor brackets 82, and is brought into engagement with the upper surfaces of the lower carriages 60 as these carriages engage the bottom of the rotating drum 21. As the train of carriages 60 emerges from the aperture 49 of the casing, the strip 80 is taken up on a power driven rotating take-up spool 83, which may be driven in any suitable manner, either by a separate motor, or by means of suitable shafting driven from the main line shaft 25. The exact means for driving this take-up spool is not shown, since it is not essential to the understanding of the invention.

A similar strip 85 is fed from a rotatable supply spool 86 mounted upon a bracket 87, secured to the exterior of the casing 45. Idler pulleys 88 and 89 are also carried by this bracket 87 and serve to turn the strip 85 at an angle so that it engages the under surfaces of the carriages 65 and is carried in contact therewith as the carriages move through the aperture 48 and the track 47, emerging therefrom through the bottom of the casing 45 at the opposite end of the drum 21. As the train of carriages 65 leaves the casing 45, the strip 85 is carried over an idler pulley 92 and wound on a spool 93 suitably driven by some source of power (not shown), such as by an individual motor or shafting connected with the main line shaft 25.

A plurality of rollers 100 attached by a bracket 101 to the left hand wall of the enclosure 11 serve to guide the rubber covered wires 15 and 16 from the extruding machine 10 and the soap stone chamber 14 to pulleys 104 carried by the bracket 87. Another set of pulleys 105, similar in character to those of 104, serve to direct the rubber covered strands 15 and 16 between grooves 70, 71, 72 and 73 respectively of carriages 65 and 60 as they are brought into engagement on entering the casing 45 through the aperture 48. Strips 80 and 85 are continuous in length and serve to provide a continuous belt of soft packing or bedding material for the comparatively soft rubber compound sheath around the walls 15 and 16 to prevent any deformation thereof due to the relative movement of the cooperating parts 60 and 65, slight irregularities in these parts, as well as to the action of the adjacent carriages 70 of each train as they are carried around the periphery of the drum 21.

When the carriages 65 emerge from the lower portion of the casing 45, the strands 15 and 16 are removed from the strip 85 and are fed over pulleys 115 and 116 respectively, rotatably mounted on a bracket 117 supported from the floor. From the pulleys 115 and 116 the strands are then drawn over pulleys 118 and 119 suitably supported by a bracket 120 mounted upon the floor and from these latter pulleys the strands pass through openings in the left hand wall of the enclosure 11. As these strands pass through the openings of the enclosure 11 they are wiped by means of felt or some other suitable substance which serves to retard the escape of air from the chamber 11. The strands 15 and 16 are then wound upon take-up spools 121 and 122 respectively, which are suitably mounted upon a shaft 123 driven by a motor 124 and mounted in the enclosure 12. The enclosure 12 is provided with doors 125 and 126, providing ready access to the take-up spools 121 and 122, so that such spools when completely filled may be individually removed.

The strip 85 is also removed from the train of carriages 65 after the strands 15 and 16 are removed therefrom, such strip being carried around the idler pulley 92 and on to the take-up spool 93 as previously mentioned.

A pneumatic cylinder 130 having a piston 131, operated by the transmission of compressed air into the cylinder through a pipe or hose 132 is connected with the extension arm 56 extending upwardly from the bracket 58 by means of a link connection 133. By regulating the pressure of the air which is admitted to the cylinder 130, the pulley 55 may be placed under sufficient tension to regulate the tension in the endless train of carriages 60 which travel around the pulley 55. A counterweight arrangement, designated generally by the character 139, operates upon the extension arm 53 of the bracket 51 to perform the same function in connection with the pulley 50 and the endless train of carriages 65 carried thereby. By adjusting the tension of these two trains of carriages, as mentioned, the proper pressure may be exerted thereby upon the strands 15 and 16 as the two trains of carriages are in engagement during their travel along the track 47.

The enclosure 11 is supplied with air under pressure through a pipe 141, and the pressure of the air within the enclosure 11 is maintained at all times substantially constant. The enclosure 12 within which the take-up mechanism is located is not maintained under the same air pressure as in the case of the enclosure 11, since frequent access to such enclosure will be necessary to remove filled take-up spools and to insert empty spools for taking up the additional strand. A door 145 is provided in the side wall of the enclosure 11 to permit access to the interior of the enclosure when necessary to reverse the respective positions of the take-up and supply spools provided for the strip material 80 and 85.

Although not shown in detail in the drawings, the conduit 42 upon passing through the head of the drum 21 is preferably bent downwards and extended along and close to the bottom of the interior of the drum. This conduit serves in the ordinary manner to remove condensation from the interior of the drum.

Each of the carriages 65 is provided with rollers 151 and 152, suitably mounted in the side walls thereof and adapted to engage the side walls of the track 47 in the casing 45 around the drum, and thus reduce the friction between the carriages and the track. Each of the carriages 60 is also provided with rollers 153 and 154 which rest against the outer periphery of the drum 21 and reduce the friction of the carriages 60 as they move lengthwise of the periphery of the drum 21 while traversing the spiral path therearound and guided by the track 47. Although the carriages 60 and 65 are strung upon the conveying cables or wires 61 and 66 respectively and are so designed that the sides of the adjacent carriages are in intimate contact while the carriages travel around the drum 21, there may be a tendency for adjacent carriages to separate slightly at the top or bottom thereof elsewhere throughout their travel. However, this slight separation and subsequent closure does not in any way tend to injure the comparatively soft rubber compound used for the sheath on the strands 15 and 16, since the strips 80 and 85 are continuous and of very flexible material.

In the operation of the device a plurality of wires, cables or other electrical conductors 15 and 16 may be fed through the extruding machine 10 which surrounds each of the conductors with a sheathing of rubber compound and later pass through the chamber 14 containing powdered talc or soapstone to coat the outside with such material, thus overcoming any tendency for the compound to readily adhere to other surfaces with which it may come in contact during the operation of the mechanism. The sheathed and coated strands 15 and 16 are then carried under the idler pulleys 100 and 104 and over the pulleys 105, from whence they are directed into the molds that are formed by the grooves 70 and 72 and 71 and 73 respectively which have previously been lined with the fabric strips 80 and 85. The carriages 60 and 65 of the two trains of carriages are brought into close engagement with the sheath and strand enclosed in the molds formed in their opposing faces as they pass through the aperture 48 in the casing 45. Due to the design and adjustment of the counterweight arrangement 140 and the pneumatic piston 131, the tension placed upon the respective trains and carriages is such that a desired pressure is exerted upon the sheathed strands 15 and 16 therebetween. The trains or carriages in engagement travel around and across the periphery of the drum 21 being guided in a spiral path thereover due to the track 47 formed in the interior wall of the casing 45. The temperature of the steam introduced through the conduit 41 into the interior of the drum 21 and the length of the track 47 are such as to insure that the sheath around the strands 15 and 16 are properly vulcanized during their travel between the carriages of these trains.

The pressure of the air within the chamber 11 is maintained at a value which is sufficient to overcome the internal stresses which may be set up in the sheathing material during the vulcanization process. This insures that any small portions of the sheathing material which are not subjected to the mechanical pressure exerted by the carriages 60 and 65 will be maintained under air or gaseous pressure of substantially the same value so that there will be no substantial differences in the size of the sheathed core, introduced by this internal stress. The lining strips 80 and 85 also tend to maintain the sheathing material within proper bounds between adjacent carriages which may become separated. It will be noted that the pulleys 50 and 55 are idlers, while the drum 21 is constantly and positively driven through the medium of the main line shaft 25 through the gears 27, 28, 35 and 36. The rotation of the drum 21 cooperating with the tension upon the trains of the carriages insures the movement of the two trains of carriages around the drum and over the pulleys.

The carriages disengage near the distant end of the drum and carriages 65 are removed from the casing at a point near the bottom thereof and carried to the bottom of the pulley 50. However, the carriages 60 continue in engagement with the drum to the top thereof and are then carried through the aperture 49 in the casing, and from thence to the top of the pulley 55. The strands 15 and 16 having the vulcanized sheathing therearound are removed from the carriages 65 after their emergence from the lower part of the casing 45 and travel over the pulleys 115, 116, 118 and 119 and through bushed openings in the left hand wall of the enclosure 11 and on to the take-up spools 121 and 122 respectively. Immediately after the removal of the strands 15 and 16 the lining strip 85 is also removed from the carriages, past the idler pulley 92 and wound upon the take-up spool 93. In a like manner the lining strip 80 is removed from the carriages 60 as they emerge through the opening 49 in the casing 45, and is wound upon the take-up spool 83.

Although only two strands, 15 and 16, are shown, it is evident that any desired number of strands may be subjected to the operation of the machine, only two being shown in order to simplify the disclosure. Also it will be noted that the enclosure 12 is provided outside of the enclosure 11 so that the constant pressure of the air within the chamber 11 may be more easily maintained and will not be deleteriously effected by the replacement of filled take-up spools by empty spools.

What is claimed is:

1. The method of vulcanizing material, which consists in progressively subjecting each portion of said material to mechanical pressure and then gaseous pressure during the subjection of the material to the requisite temperature and for the requisite time to vulcanize it.

2. The method of vulcanizing material, which consists in progressively subjecting each portion of said material to gaseous pressure, then mechanical pressure and finally gaseous pressure during the subjection of the material to the requisite temperature and for the requisite time to vulcanize it.

3. The method of vulcanizing material in strand form, which consists in moving the strand longitudinally and simultaneously subjecting the said material to mechanical pressure and then gaseous pressure progressively during the subjection of the material to the requisite temperature and for the requisite time to vulcanize it.

4. The method of vulcanizing material in strand form, which consists in moving the strand longitudinally and simultaneously subjecting the said material to gaseous pressure, then mechanical pressure and finally gaseous pressure progressively during the subjection of the material to the requisite temperature and for the requisite time to vulcanize it.

5. In a vulcanizing apparatus, a rotating heated drum, a conveyor for carrying material, means for causing the conveyor to follow a spiral path when traveling over the periphery of the drum, and means for reducing the friction between the drum and conveyor.

6. In a vulcanizing apparatus, a rotating vulcanizing drum, a conveyor for carrying material, means exterior of the drum for guiding the conveyor in a spiral path over the surface of the drum, thereby vulcanizing the material, and means to reduce the friction between the conveyor and the guiding means therefor.

7. In a vulcanizing apparatus, a rotating heated drum, a train of carriages for carrying material, means for causing the train of carriages to follow a spiral path in traveling over the periphery of the drum, and means associated with the train for reducing the friction between the drum and the train.

8. In a vulcanizing apparatus, a rotating heated drum, a train of carriages for carrying vulcanizable material, means exterior of the drum for guiding the train in a spiral path over the periphery of the drum, and means associated with each carriage of the train to reduce the friction between the carriage and the guiding means.

9. In a vulcanizing apparatus, means for vulcanizing material, a train of separable molds for carrying vulcanizable material into, through and out of the vulcanizing means, means for feeding vulcanizable material to the molds, means for introducing supporting material between the mold portions and the vulcanizable material, means for separately removing the vulcanized and supporting materials from the train of separable molds as the mold portions separate when the train leaves the vulcanizing means, and means for subjecting the vulcanizable material to air pressure throughout its travel.

10. In a vulcanizing apparatus, means for vulcanizing material, a train of separable molds for carrying vulcanizable material into, through and out of the vulcanizing means, means for feeding a plurality of independent continuous lengths of vulcanizable material to the train before the mold portions are brought into engagement, and for simultaneously therewith introducing common supporting material between the mold portions and the independent lengths of vulcanizable material, means for separating the mold portions as they leave the vulcanizing means, means for separately removing therefrom the plurality of lengths of vulcanized material and the common supporting strips, and means for subjecting the vulcanizable material to air pressure throughout the travel thereof.

11. In a vulcanizing apparatus, an enclosure containing air under pressure and in direct connection with an apparatus for extruding a strand of vulcanizable material, a conveyor within the enclosure for conveying the extruded strand over the periphery of a heated drum, thereby vulcanizing the strand, and means for storing the vulcanized strand upon its discharge from the conveyor.

12. In a vulcanizing apparatus, an enclosure containing air under pressure and in direct connection with an apparatus for extruding a strand of vulcanizable material, a conveyor within the enclosure for conveying the extruded strand over the periphery of a heated drum and thereby vulcanizing the strand, and means outside of the enclosure for withdrawing the vulcanized strand from the conveyor and the enclosure.

13. In a vulcanizing apparatus, an enclosure containing air under pressure and in direct connection with an apparatus for extruding a strand of vulcanizable material, a conveyor within the enclosure for conveying the extruded strand over the periphery of a heated drum, thereby vulcanizing the strand, means located outside of the enclosure for withdrawing the strand from the conveyor and the enclosure, and a second enclosure attached to the first enclosure for enclosing the withdrawing means.

In witness whereof, I hereunto subscribe my name this 11 day of October A. D., 1923.

LESLIE FAWCETT LAMPLOUGH.